(12) United States Patent
Toda

(10) Patent No.: US 8,503,005 B2
(45) Date of Patent: Aug. 6, 2013

(54) IMAGE FORMING APPARATUS THAT PRINTS COMBINED IMAGE INCLUDING IMAGE DATA AND EMBEDDED INFORMATION IN IMAGE FILE, IMAGE PRINTING SYSTEM, IMAGE COMBINING AND OUTPUTTING METHOD, AND COMPUTER PRODUCT

(75) Inventor: Katsuyuki Toda, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 1108 days.

(21) Appl. No.: 11/362,106

(22) Filed: Feb. 27, 2006

(65) Prior Publication Data
US 2006/0209316 A1    Sep. 21, 2006

(30) Foreign Application Priority Data

Mar. 17, 2005  (JP) ................................. 2005-077634

(51) Int. Cl.
*G06K 15/02* (2006.01)
(52) U.S. Cl.
USPC .......... 358/1.15; 358/1.18; 358/1.9; 358/462; 358/453; 358/450; 348/207.2; 348/231.2; 348/231.3; 348/231.5
(58) Field of Classification Search
USPC . 358/1.15, 1.18, 1.9, 462, 453, 450; 382/173, 382/176, 217, 219, 284; 715/221–226; 348/207.2, 231.2, 231.3, 231.5
See application file for complete search history.

(56) References Cited

U.S. PATENT DOCUMENTS

| | | | | |
|---|---|---|---|---|
| 5,167,436 A | * | 12/1992 | Wu | 297/338 |
| 5,748,284 A | * | 5/1998 | Manico et al. | 355/39 |
| 5,940,169 A | * | 8/1999 | Masutani | 355/40 |
| 5,978,607 A | * | 11/1999 | Teremy et al. | 396/288 |
| 6,157,436 A | * | 12/2000 | Cok | 355/40 |
| 6,198,526 B1 | * | 3/2001 | Ohtsuka | 355/40 |
| 6,493,108 B1 | * | 12/2002 | Hirai | 358/1.18 |
| 6,690,883 B2 | * | 2/2004 | Pelletier | 396/321 |
| 6,711,637 B2 | * | 3/2004 | Tateyama | 710/65 |
| 6,774,980 B2 | * | 8/2004 | Hoshino et al. | 355/40 |
| 6,788,384 B2 | * | 9/2004 | Iida | 355/40 |
| 6,853,461 B1 | * | 2/2005 | Shiimori | 358/1.15 |
| 6,954,282 B2 | * | 10/2005 | Miyamoto et al. | 358/1.18 |
| 6,985,148 B2 | * | 1/2006 | Liang et al. | 345/473 |

(Continued)

FOREIGN PATENT DOCUMENTS

| | | |
|---|---|---|
| JP | 2003-224750 | 8/2003 |
| JP | 2004-050407 | 2/2004 |
| JP | 2004-064740 | 2/2004 |
| JP | 2005-047009 | 2/2005 |

OTHER PUBLICATIONS

Office Action mailed Mar. 23, 2010 for corresponding Japanese Patent Application No. 2005-077634.

*Primary Examiner* — Dennis Dicker
(74) *Attorney, Agent, or Firm* — Harness, Dickey & Pierce, P.L.C.

(57) ABSTRACT

In an image forming apparatus, when embedded information, which is information embedded into received image file, is to be printed, the embedded information is extracted from the image file, form data for preparing a form that includes an information-embedding area where extracted embedded information is to be arranged and an image-data area where the image data in the received image file is to be arranged is prepared, a combined image is generated by combining the extracted embedded information in the information-embedding area and the image data in the image-data area, and the combined image is printed.

31 Claims, 8 Drawing Sheets

U.S. PATENT DOCUMENTS

| | | | |
|---|---|---|---|
| 7,009,643 B2 * | 3/2006 | Nakamura et al. | 348/231.4 |
| 7,042,496 B2 * | 5/2006 | Sato | 348/207.2 |
| 7,126,639 B2 * | 10/2006 | Cazier et al. | 348/370 |
| 7,139,095 B1 * | 11/2006 | Hunter | 358/1.18 |
| 7,379,213 B2 * | 5/2008 | Koizumi | 358/3.27 |
| 7,456,871 B2 * | 11/2008 | Iida et al. | 348/231.5 |
| 7,502,133 B2 * | 3/2009 | Fukunaga et al. | 358/1.15 |
| 7,532,239 B2 * | 5/2009 | Hayaishi | 348/223.1 |
| 7,587,460 B2 * | 9/2009 | Saito | 709/207 |
| 7,706,009 B2 * | 4/2010 | Oka | 358/1.15 |
| 8,179,546 B2 * | 5/2012 | Aichi et al. | 358/1.15 |
| 8,253,967 B2 * | 8/2012 | Kitamaru | 358/1.18 |
| 2002/0059322 A1 * | 5/2002 | Miyazaki et al. | 707/200 |
| 2003/0095197 A1 * | 5/2003 | Wheeler et al. | 348/241 |
| 2005/0081147 A1 * | 4/2005 | Tanaka et al. | 715/517 |
| 2005/0140789 A1 * | 6/2005 | Yasuda | 348/207.2 |
| 2006/0053370 A1 * | 3/2006 | Hitaka et al. | 715/517 |
| 2006/0126113 A1 * | 6/2006 | Narazaki | 358/1.15 |

* cited by examiner

Exif FILE FORMAT (PRINT JOB INFORMATION; INDEX PRINTING)

# IMAGE FORMING APPARATUS THAT PRINTS COMBINED IMAGE INCLUDING IMAGE DATA AND EMBEDDED INFORMATION IN IMAGE FILE, IMAGE PRINTING SYSTEM, IMAGE COMBINING AND OUTPUTTING METHOD, AND COMPUTER PRODUCT

CROSS-REFERENCE TO RELATED APPLICATIONS

The present document incorporates by reference the entire contents of Japanese priority document, 2005-077634 filed in Japan on Mar. 17, 2005.

BACKGROUND OF THE INVENTION

1. Field of the Invention

The present invention relates to an image forming apparatus that receives an image file transferred from an image supplying apparatus that is connected thereto via an interface to print image data in the image file, an image printing system, a program, and an image combining and outputting method.

2. Description of the Related Art

Conventionally, to print image data acquired with a digital still camera, an image file that includes the image data is temporarily downloaded in a personal computer (PC). The downloaded image data is then loaded into application software for images, and processed and edited if necessary. Finally, the image data is printed on the PC by using a printer driver. Conventional printing of digital images is not simple because it requires data transfer to PCs and application software.

Recently, the standard for a direct print system is defined that a digital still camera as an image supplying apparatus is connected to a printer device as an image forming apparatus without using a PC so that images files in the digital still camera can be directly printed out. Digital cameras and printer devices that support the standard are becoming widespread (for example, see Japanese Patent Application Laid-open No. 2004-064740). According to such digital cameras and printer devices corresponding to the standard for the direct print system, image files can be directly transferred from the digital still cameras to the printer devices and can be printed without using PCs.

Digital still cameras can, at a time of imaging, record titles and text information corresponding to the taken images in an Exchangeable Image File Format (Exif) header. For example, Japanese Patent Application Laid-Open No. 2003-224750 describes a digital still camera that a character string associated with an image is input in the digital still camera and then stored in the Exif header of the image. The information thus embedded into the Exif header is used for managing or searching for the image on a PC.

The standard for the direct print system described in Japanese Patent Application Laid-Open No. 2004-064740 is a communication command format that is common to various manufacturers, and selections are made on User Interfaces (UIs) for digital still cameras and the selected data is output. Thus, complicated printing specifications are not prepared and only outputs with limited functions are made possible, as compared to outputs from PCs.

Specifically, the specifications only allow one image to be output on a sheet. Even if a plurality of images are output on a sheet, output results that suit user's taste cannot be obtained because complicated layout specifications are not made possible. Basically, the direct print system is provided to output taken images in a manner that photographic films that silver photographs are taken thereon are output on photographic printing paper. For example, outputs that include an area where memos are added to a sheet with output images and standard formats for attaching images (e.g., reports, minutes of meetings, resumes, and business cards with photos) cannot be prepared directly. To prepare documents such as reports with images taken by digital still cameras, image files are temporarily downloaded in a PC, application software is activated, and documents are prepared using downloaded images and printed. A series of these operations takes much labor.

When the information embedded into the Exif header is referred as described in Japanese Patent Application Laid-Open No. 2003-224750, dedicated application software for viewing images is required. When an image to which the information set by user is added is output in a highly convenient manner, the image must be output through the dedicated application software to a printer device.

SUMMARY OF THE INVENTION

It is an object of the present invention to at least solve the problems in the conventional technology.

According to an aspect of the present invention, an image forming apparatus that receives an image file transferred from an image supplying apparatus that is connected thereto via an interface to print image data in the image file includes an information printing determining unit that determines whether embedded information that is information embedded into received image file is to be printed; an information analyzing unit that extracts the embedded information from the image file when it is determined by the information printing determining unit that the embedded information is to be printed; a storage unit that stores therein form data for preparing a form that includes an information-embedding area where extracted embedded information is to be arranged and an image-data area where the image data in the received image file is to be arranged; an image combining unit that reads the form data from the storage unit and generates a combined image by combining the extracted embedded information in the information-embedding area and the image data in the image-data area; and an image output unit that outputs the combined image to an image forming unit.

According to another aspect of the present invention, an image printing system that includes an image supplying apparatus that can supply an image file is connected via an interface to an image forming apparatus that prints image data in an image file received from the image supplying apparatus includes an information printing determining unit that determines whether embedded information that is information embedded into received image file is to be printed; an information analyzing unit that extracts the embedded information from the image file when it is determined by the information printing determining unit that the embedded information is to be printed; a storage unit that stores therein form data for preparing a form that includes an information-embedding area where extracted embedded information is to be arranged and an image-data area where the image data in the received image file is to be arranged; an image combining unit that reads the form data from the storage unit and generates a combined image by combining the extracted embedded information in the information-embedding area and the image data in the image-data area; and an image output unit that outputs the combined image to an image forming unit.

According to still another aspect of the present invention, an image combining and outputting method includes determining whether embedded information that is information embedded into a received image file that contains image data is to be printed; extracting the embedded information from the image file when it is determined at the determining that the embedded information is to be printed; preparing form data for preparing a form that includes an information-embedding area where extracted embedded information is to be arranged and an image-data area where the image data in the received image file is to be arranged; generating a combined image by combining the extracted embedded information in the information-embedding area and the image data in the image-data area of prepared form data; and printing the combined image.

According to still another aspect of the present invention, a computer-readable recording medium stores therein a computer program that causes a computer to implement the above method.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an image printing system according to the present invention are described below in detail with reference to the accompanying drawings.

Figure 1:
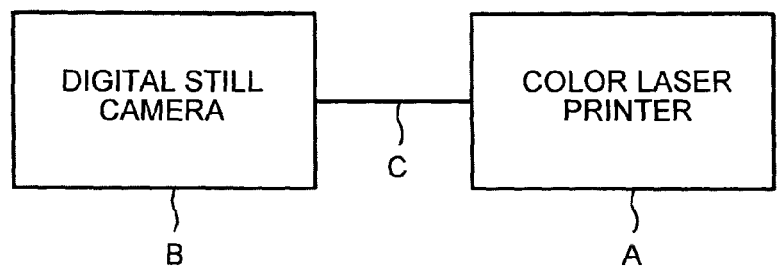
FIG. 1 is a schematic configuration diagram of an image printing system according to a first embodiment of the present invention.

FIG. 1 is a schematic configuration diagram of an image printing system according to a first embodiment of the present invention. As shown in FIG. 1, the image printing system according to the embodiment is such that a color laser printer A as an image forming apparatus is connected via a Universal Serial Bus (USB) cable C as an interface to a digital still camera B as an image supplying apparatus.

Figure 2:
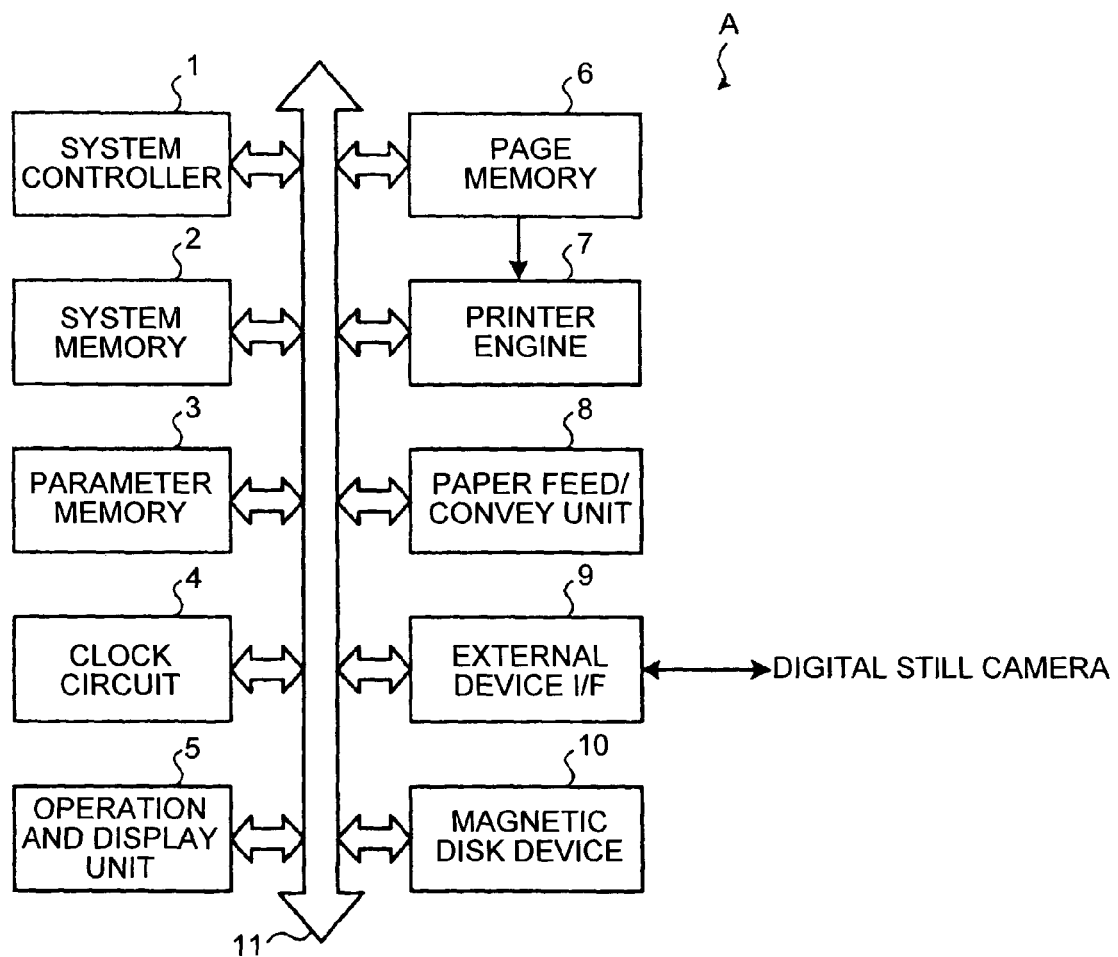
FIG. 2 is a block diagram of an example of a configuration of a color laser printer.

The color laser printer A as the image forming apparatus is described first. FIG. 2 is a block diagram of an example of the configuration of the color laser printer A. As shown in FIG. 2, the color laser printer A includes a system controller 1 that performs various control processing such as control processing of respective units of the color laser printer A and an image forming process. The system controller 1 is mainly configured by a central processing unit (CPU) that constitutes a microcomputer, and controls the entire color laser printer A according to a control processing program stored in a system memory 2 or a magnetic disk device 10.

Connected via an internal bus 11 to the system controller 1 are the system memory 2, a parameter memory 3, a clock circuit 4, an operation and display unit 5, a page memory 6, a printer engine 7, a paper feed/convey unit 8, an external device interface circuit 9, and the magnetic disk device 10. Data transfer between these components is performed mainly via the internal bus 11.

The system memory 2 stores the control processing program executed by the system controller 1 and various data required for executing the control processing program, and provides a work area for the system controller 1. The parameter memory 3 stores various pieces of information that are specific to the color laser printer A.

The clock circuit 4 outputs current time information. The operation and display unit 5 operates the color laser printer A and includes various operational keys and displays.

The page memory 6 holds image data to be printed (print-rendered image). The printer engine 7 is an image forming unit that records and outputs an image of the image data held in the page memory 6 on a recording sheet (not shown). The paper feed/convey unit 8 separates a recording sheet from a sheet cassette (not shown) that stores recording sheets, feeds the recording sheet to an image recording position of the printer engine 7, and finally discharges the recording sheet to a paper discharge tray (not shown). Because the color laser printer A according to this embodiment is a laser printer, the printer engine 7 forms an image by an electrophotographic process system, and records and outputs the image on a recording sheet.

The external device interface circuit 9 is connected via the USB cable C to the digital still camera B to receive the image data and send printing capability information (output quality, sheet size, sheet type, support image format, date output, file name output, layout information for sheet sizes) to the digital still camera B.

The magnetic disk device 10 stores various print document information and saves other appropriate information data. Examples of the information data held by the color laser printer A according to this embodiment include form data for preparing a form D in a predetermined format that includes a plurality of areas a for images to be arranged and a plurality of areas b for memos to be added. Namely, the magnetic disk device 10 as a storage unit stores the form data for preparing the form D.

Figure 4:
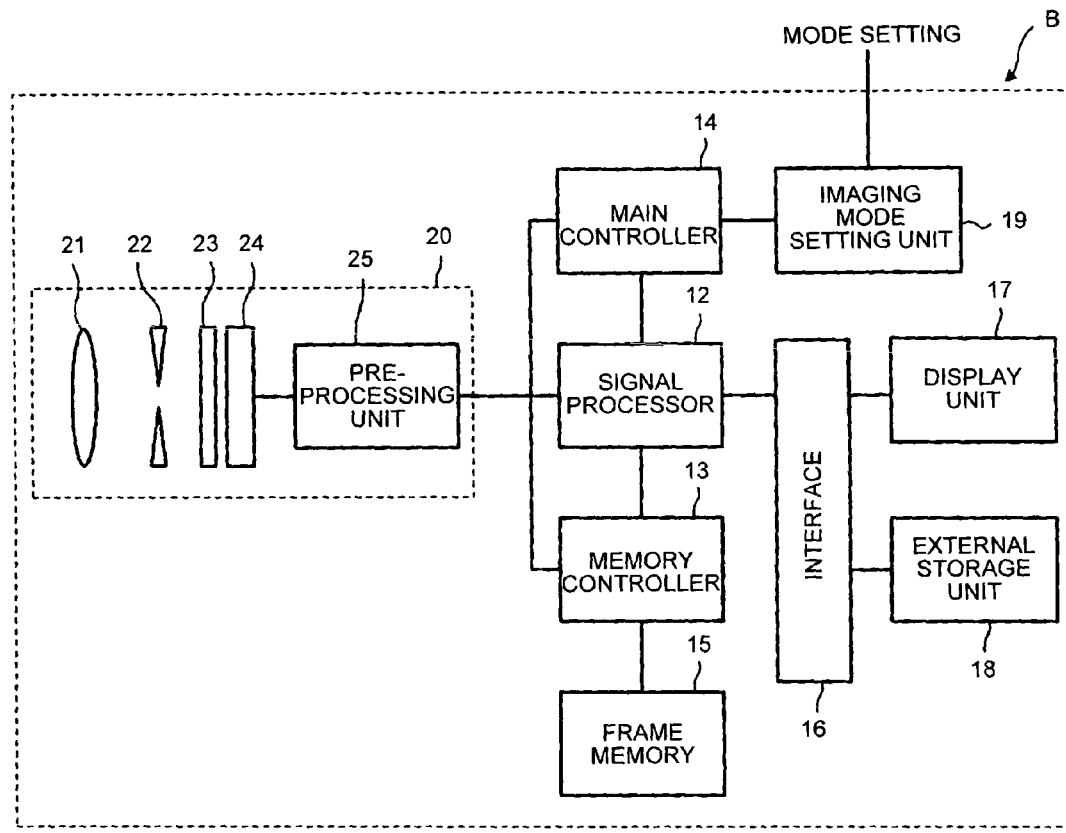
FIG. 4 is a schematic block diagram of a hardware configuration of a digital still camera.
Figure 5:
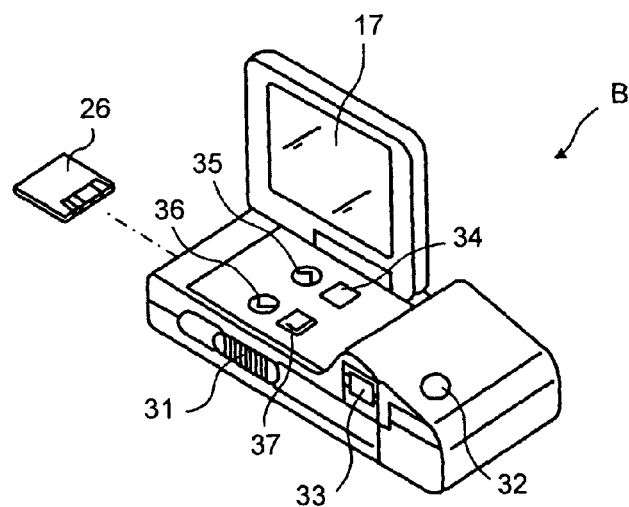
FIG. 5 is a schematic perspective view of the exterior configuration of the digital still camera.

The digital still camera B as the image supplying apparatus is described next. FIG. 4 is a schematic block diagram of the hardware configuration of the digital still camera B. FIG. 5 is a schematic perspective view of the exterior configuration of the digital still camera B.

As shown in FIG. 4, the digital still camera B as the image supplying apparatus schematically includes, a signal processor 12, a memory controller 13, a main controller 14, a frame memory 15, an interface 16, a display unit 17, an external storage unit 18 that can record/read various data in/from a media 26 as a storage medium for externally storing or distributing information or for obtaining information from externals, an imaging mode setting unit 19, an imaging unit 20, a touch panel 27, an operation unit 28, and a microphone 29.

The imaging unit 20 includes a lens 21, an aperture 22, a shutter 23, a photoelectric conversion element 24, and a pre-processing unit 25.

The signal processor 12 is connected to the pre-processing unit 25, the memory controller 13, the main controller 14, and the interface 16. The memory controller 13 is connected to the frame memory 15. The main controller 14 is connected to the memory controller 13, the imaging mode setting unit 19, and the microphone 29. The microphone 29 is connected via an analog-digital converter (A/D converter) 30 to the main controller 14. The frame memory 15 is connected to the memory controller 13. The interface 16 is connected to the display unit 17, the external storage unit 18, the touch panel 27, and the operation unit 28. The USB cable C for communicating with the color laser printer A is connected to the interface 16.

In the imaging unit 20, the lens 21, the aperture 22, the shutter 23, and the photoelectric conversion element 24 are arranged in this order on an optical axis. The photoelectric conversion element 24 is connected to the pre-processing unit 25. For example, charge coupled devices (CCDs) are used for the photoelectric conversion element 24 in the imaging unit 20. The pre-processing unit 25 includes an analog signal processor formed of a preamplifier and an auto gain control (AGC) circuit and an A/D converter. Analog picture signals output from the photoelectric conversion element 24 are subjected to pre-processing including amplification and clamp, and then converted into digital picture signals.

The signal processor 12 is configured by a digital signal processor (DSP processor). The signal processor 12 has an image compression function and performs various image processing such as color separation, white balance adjustment, and gamma correction for digital picture signals obtained from the imaging unit 20.

The memory controller 13 stores image signals thus processed in the frame memory 15. Conversely, the memory controller 13 also reads out these image signals stored in the frame memory 15.

The main controller 14 is configured by a microcomputer that includes a CPU that controls intensively the respective units of the digital still camera B, a read only memory (ROM) that stores various control programs used by the CPU, and a random access memory (RAM) as a work area. Instead of the control programs stored in the ROM, as shown in FIG. 5, the media 26 that stores the control programs is attached to the external storage unit 18 of the digital still camera B so that the CPU of the digital still camera B can execute the control programs. The frame memory 15 stores at least two images. Generally, semiconductor memories including video RAM (VRAM), static RAM (SRAM), and dynamic RAM (DRAM) are used for the frame memory 15.

Image signals read out of the frame memory 15 are subjected to signal processing such as image compression in the signal processor 12. The image signals are then saved as image files via the interface 16 in the external storage unit 18. The external storage unit 18 reads/writes various signals such as image signals provided via the interface 16 and is configured by an IC memory card or a magneto-optical disk.

Read out of image signals recorded in the external storage unit 18 is performed as follows. An image signal is sent via the interface 16 to the signal processor 12. In the signal processor 12, the image signal is then subjected to image decompression. The image signal read out of the frame memory 15 or the external storage unit 18 is subjected to signal processing including digital-analog conversion (D/A conversion) and amplification in the signal processor 12. The image signal is then sent via the interface 16 to the display unit 17 so as to be displayed thereon. The display unit 17 displays images according to image signals provided thereto via the interface 16, and is configured by, for example, a liquid crystal display (LCD) that is mounted on the housing of the digital still camera B.

As shown in FIG. 5, from the exterior view, the digital still camera B has a power switch 31, a shutter 32, a finder 33, an imaging mode setting key 34 for setting imaging modes in the imaging mode setting unit 19, scroll keys 35, 36 for scrolling images displayed on the display unit 17 in a vertical direction, and a decision key 37. The shutter 32, the imaging mode setting key 34, the scroll keys 35, 36, and the decision key 37 configure the operation unit 28.

Figure 6:
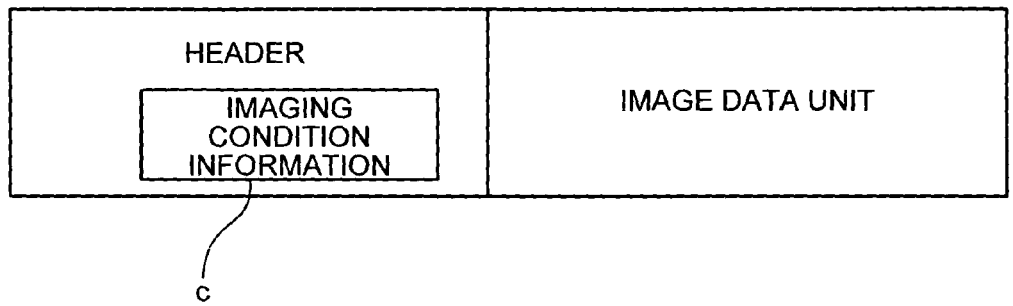
FIG. 6 is an explanatory diagram of an Exif file format.

Image files saved in the external storage unit 18 have an Exif file format. As shown in FIG. 6, the Exif file format is configured by an image data unit that records JPEG images (in a Tag Image File Format (TIFF format) when they are not compressed) as data of taken images and an Exif header unit. Stored in the Exif header unit is imaging condition information c including a manufacturer name of the digital still camera B, its model name, a version of the software for the digital still camera, an exposure program mode, a photometry mode, an aperture value, an open aperture value, a shutter speed, a focal distance, a focused distance, an exposure correction value, an ISO sensitivity value, a date, determination of light sources, and use of flash lamp. Such imaging condition information c is generated by an imaging condition information generating process that is performed by the signal processor 12 and provided. The Exif header unit can record, in addition to the imaging condition information c, additional information recorded in the TIFF format (information of images, thumbnail images, and the like) and WAV (wave) files as audio data recorded at the time of imaging.

The operations of the image printing system is described next.

The color laser printer A and the digital still camera B according to this embodiment support the standard of known direct print system that digital still cameras are connected to printer devices, so that image files in digital still cameras can be directly printed out. According to the color laser printer A and the digital still camera B based on this embodiment, the digital still camera B is connected via the USB cable C to the color laser printer A. Accordingly, various print settings and print instructions on the side of the digital still camera B, and error messages on the side of the color laser printer A are displayed on the digital still camera B.

Figure 7:
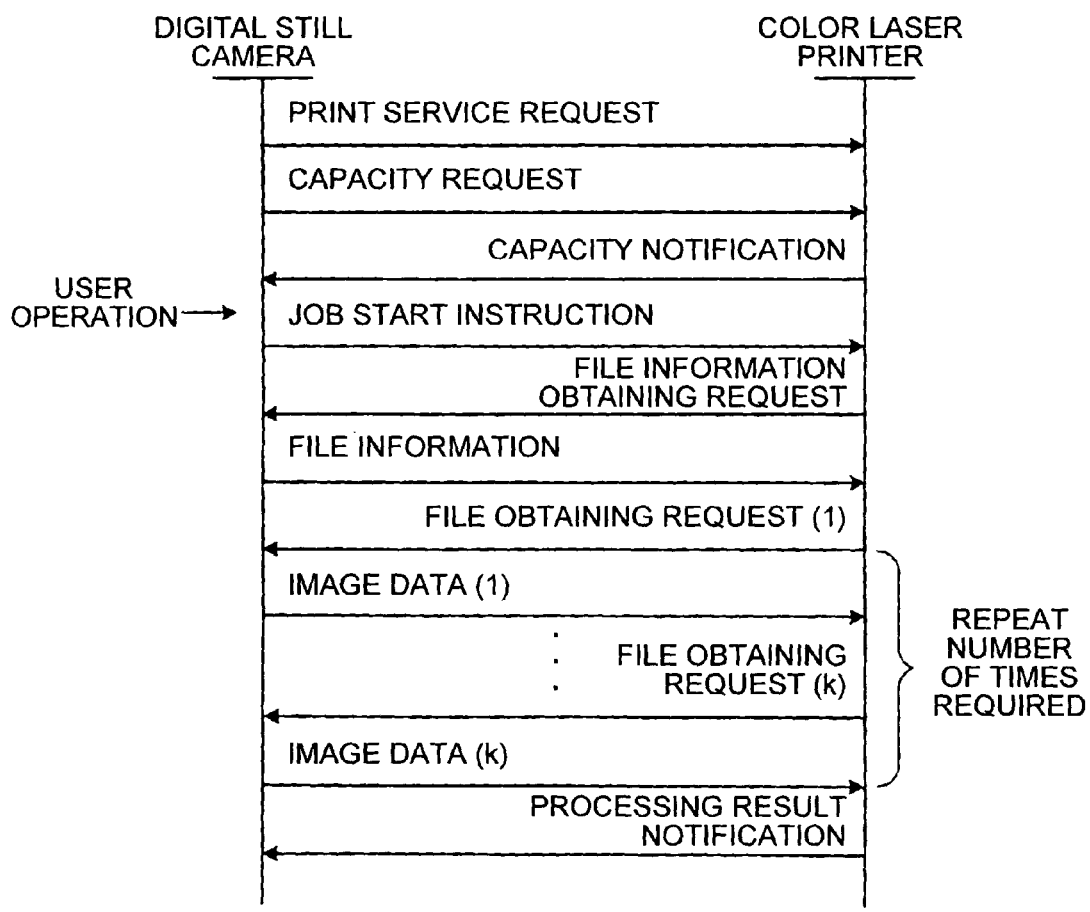
FIG. 7 is a sequence diagram of an example of a communication procedure when the digital still camera instructs the color laser printer to print images.

FIG. 7 is an example of a communication procedure for the digital still camera B to instruct the color laser printer A to print images.

Firstly, a user connects the digital still camera B to the color laser printer A by the USB cable C, and instructs the digital still camera B to print images.

The digital still camera B sends a command "print service request" to the color laser printer A, and subsequently a command "capability request" thereto.

When receiving the command "capability request", the color laser printer A sends a response "capability notification" that includes capability information that can be specified at the time of printing by itself.

The capability information includes an output quality (high speed/normal/high quality image and the like), a sheet size, an available image format, a date output, and the number of aggregated prints. "The number of aggregated prints" indicates the number of frames (images) that can be specified per sheet when an aggregated layout as an arrangement layout at the time of arranging a plurality of images on a sheet is selected.

On the side of the digital still camera B, the user is directed to input printing conditions (such as output quality, sheet size, presence or absence of date output, number of aggregated prints, and instruction of index printing) according to the capability information that is informed by the color laser printer A, and to select images to be printed.

Figure 8:
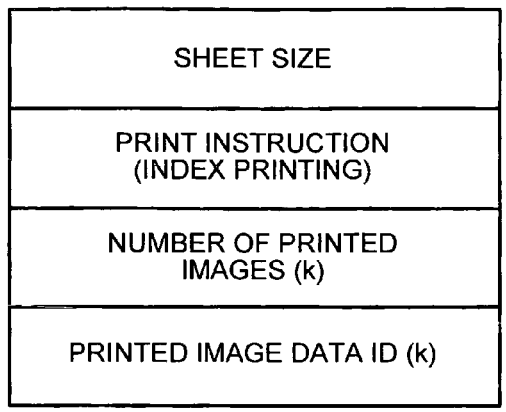
FIG. 8 is a schematic diagram of print job information.

When the user's operation ends, the digital still camera B sends a command "job start instruction" that includes print job information as shown in FIG. 8 to the color laser printer A. When "index printing" is instructed by the user's operation, the "index printing" is provided as a print instruction. The print job information includes a sheet size specified by the user, the number of images designated by the user for index printing (the number (k) of printed images), and k printed image data IDs for identifying the respective images designated by the user for index printing. When all images are automatically selected at the time of index printing, the value of the number (k) of printed images is set to the number of all images accumulated in the digital still camera B at that time. As the printed image data ID, data that indicate all images are set.

The color laser printer A successively specifies one or more printed image data IDs included in the received print job information and sends one or more responses "file obtaining request" to the digital still camera B.

The digital still camera B sends image data of the specified printed image data IDs one by one to the color laser printer A.

The color laser printer A creates index printing data based on the received image data and appropriately performs the printing operation if necessary. As the received image data is encoded in any image format, it is decoded to create, for example, image data in an RGB format. The image data in the RGB format is then converted into print data. A magnification of a printed image is appropriately changed according to the relationship between the size of the image data (resolution and pixel count) and the size of a print sheet or a print area.

When all printing operations end, the result is sent to the digital still camera B as a response "processing result notification".

When the digital still camera B receives the response "processing result notification" from the color laser printer A, the print job ends.

Characteristic functions fulfilled by operations of the system controller 1 of the color laser printer A according to the control processing program are described next.

Figure 9:
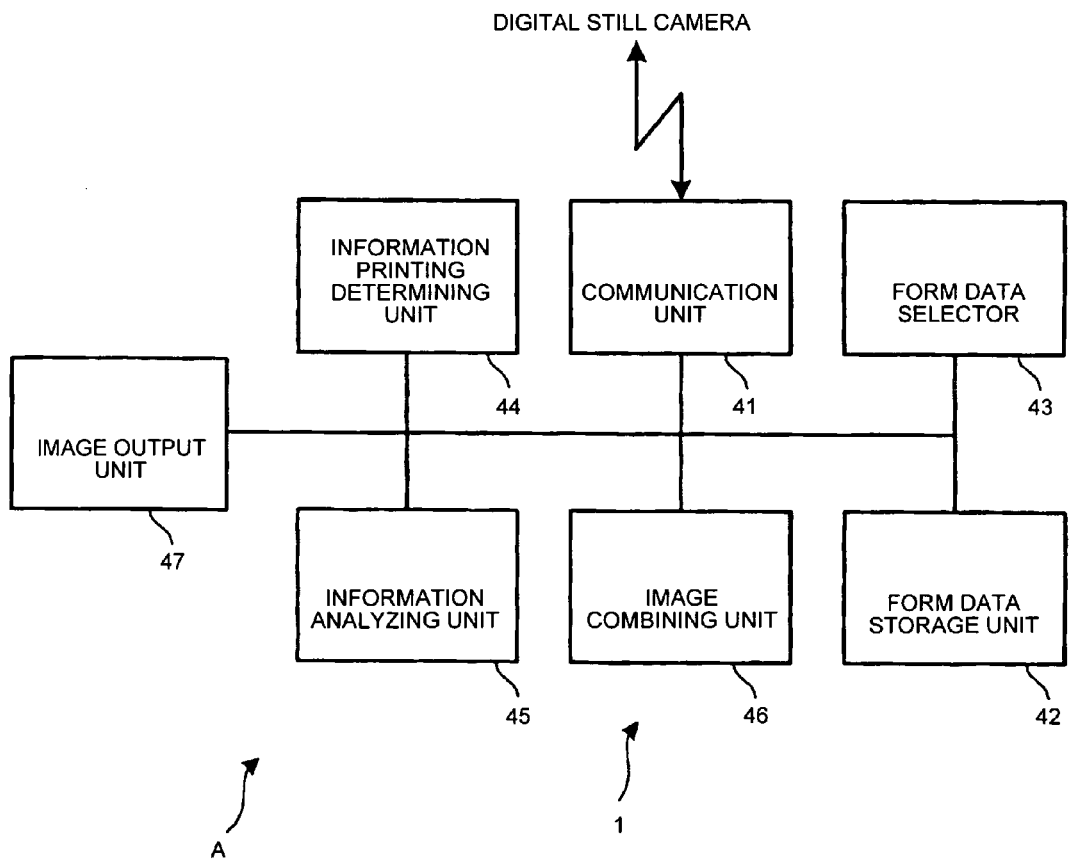
FIG. 9 is a functional block diagram of characteristic functions fulfilled by operations of a system controller provided in the color laser printer according to a control processing program.

FIG. 9 is a functional block diagram of characteristic functions fulfilled by operations of the system controller 1 provided in the color laser printer A according to the control processing program. As shown in FIG. 9, by operations of the control processing program, the system controller 1 fulfils functions of a communication unit 41, a form data storage unit 42, a form data selector 43, an information printing determining unit 44, an information analyzing unit 45, an image combining unit 46, and an image output unit 47.

The communication unit 41 controls communications with the digital still camera B connected thereto via the USB cable C. Furthermore, the communication unit 41 receives image data from the digital still camera B and sends print capability information (output quality, sheet size, sheet type, support image format, date output, file name output, layout information for sheet sizes) to the digital still camera B.

The form data storage unit 42 stores various form data (e.g., the form data of the form D shown in FIG. 3) in the magnetic disk device 10.

The form data selector 43 selects, based on print setting information from the digital still camera B, form data from various form data held in the magnetic disk device 10 by the form data storage unit 42.

The information printing determining unit 44 determines whether the information (the imaging condition information c) embedded into the image file that is received by the communication unit 41 from the digital still camera B is printed.

The information analyzing unit 45 obtains the information (the imaging condition information c) embedded into the image file that is received from the digital still camera B when it is instructed by the information printing determining unit 44 to print the information (the imaging condition information c) embedded into the image file.

The image combining unit 46 combines the image file received by the communication unit 41 from the digital still camera B with the form data that is selected by the form data selector 43 from various form data held by the form data storage unit 42 in the magnetic disk device 10. When it is instructed by the information printing determining unit 44 to print the information (the imaging condition information c) embedded into the image file, the information analyzing unit 45 obtains the information (the imaging condition information c) included in the image file. Characters that represent the information (the imaging condition information c), images, and the form are then combined so as to be output.

The image output unit 47 outputs the image obtained by combining in the image combining unit 46 to the printer engine 7 as an image forming unit.

Specific examples of the characteristic functions fulfilled operations by the system controller 1 of the control processing program are described next.

For example, when, on the side of the digital still camera B, a user specifies to print imaging conditions of images (e.g., shutter speed) by using the display unit 17 of the digital still camera B, in the color laser printer A, the images specified by the user to be output are rendered, the form data is rendered, and the imaging condition information c that is stored in the header of the Exif image file is referred in order to be printed as characters.

Figure 3:
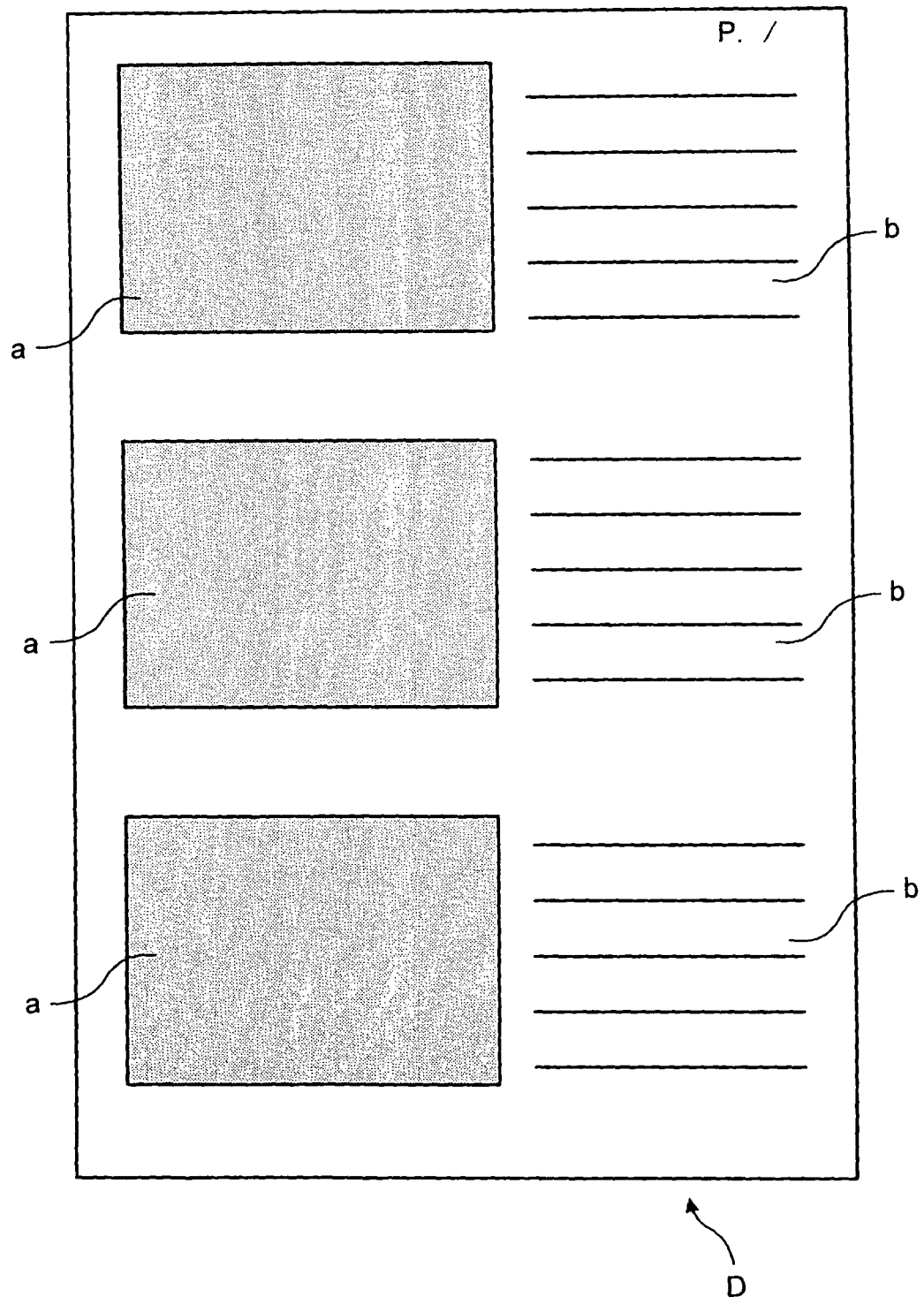
FIG. 3 is a plan view of an example of a form format.
Figure 10:
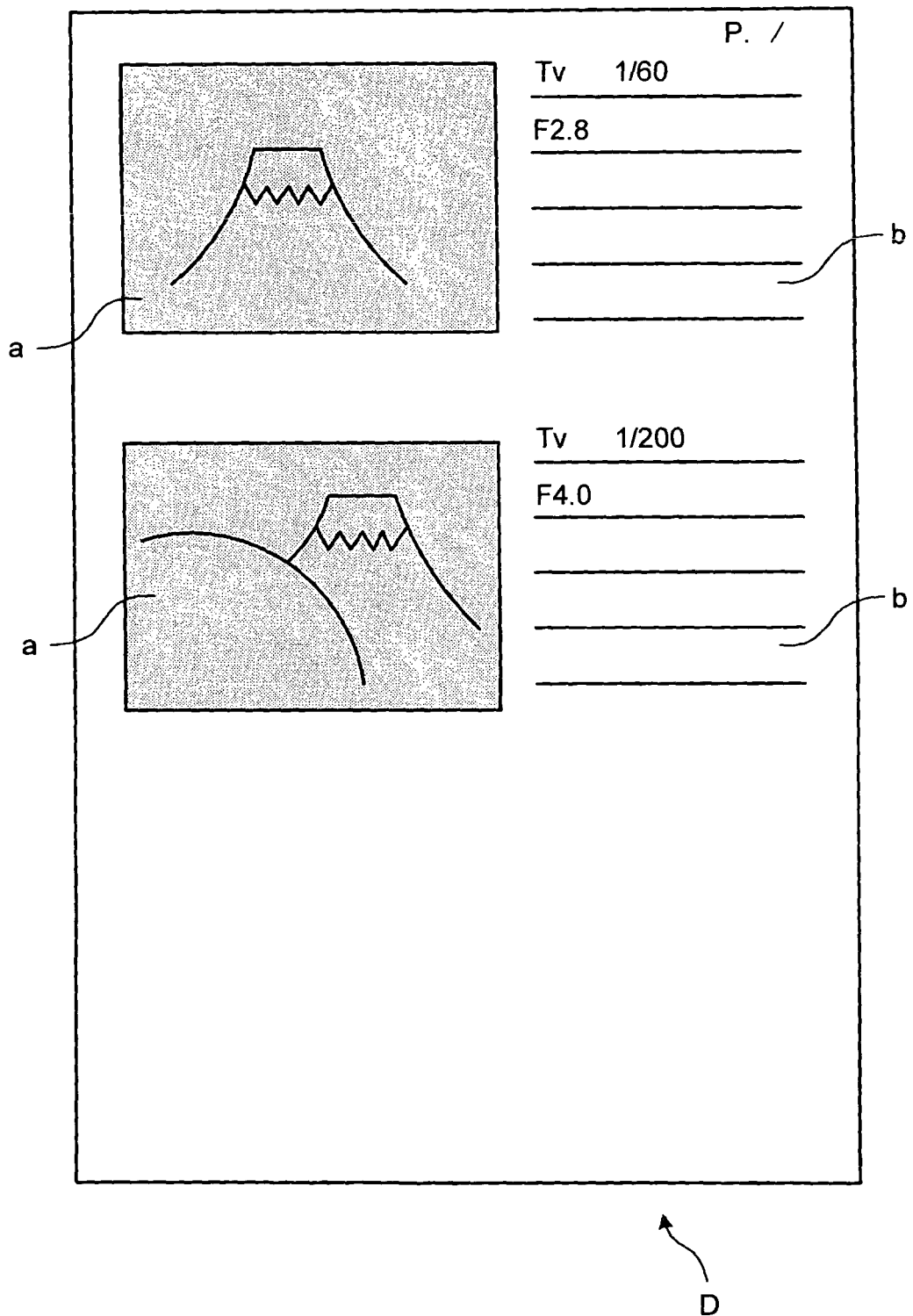
FIG. 10 is a plan view of an example of a printed form.

FIG. 10 is an example of a printed form when the form data for preparing the form D shown in FIG. 3 is selected by the form data selector 43. With reference to FIG. 10, the image data in the image file received from the digital still camera B is printed on the area a of the form D, and the imaging condition information c (shutter speed) included in the image file is printed on the area b of the form D.

As described above, according to this embodiment, an image is generated that the image data in the image file and the information embedded into the image file are arranged according to the configuration of the form data stored in advance in the magnetic disk device 10, and the generated image is output to the printer engine 7. Thus, at the time of direct print that the digital still camera B is directly connected to the color laser printer A, a user can print the information embedded into the image file as characters by an easier and simpler system. Accordingly, the color laser printer A with a highly convenient output function, the image printing system, the program and the image combining and outputting method can be provided.

As the information that is embedded into the image file is the imaging condition information c about imaging conditions of the image data in the image file, for example, a shutter speed is printed and output together with the image data.

While the control processing program that is executed in the system controller 1 of the color laser printer A as the image forming apparatus according to this embodiment is provided by being stored in advance in the system memory 2 or the magnetic disk device 10, the present invention is not limited to such a configuration. For example, the control processing program can be stored in computers connected to networks including the Internet and provided by being downloaded via such networks. In addition, the control processing program can be provided or distributed via networks including the Internet. The control processing program can be recorded in computer readable recording media including CD-ROM, a flexible disk (FD), CD-R, and digital versatile disk (DVD) in installable or executable file formats.

A second embodiment of the present invention is described with reference to FIGS. 11 to 13. Like constituent elements as those in the first embodiment are designated with like reference numerals, and their descriptions are omitted. According to the first embodiment, the imaging condition information c is printed as the information embedded into the image file. This embodiment is different from the first embodiment in that text information that is memos such as title names of taken images input by the digital still camera B is printed.

Figure 11:
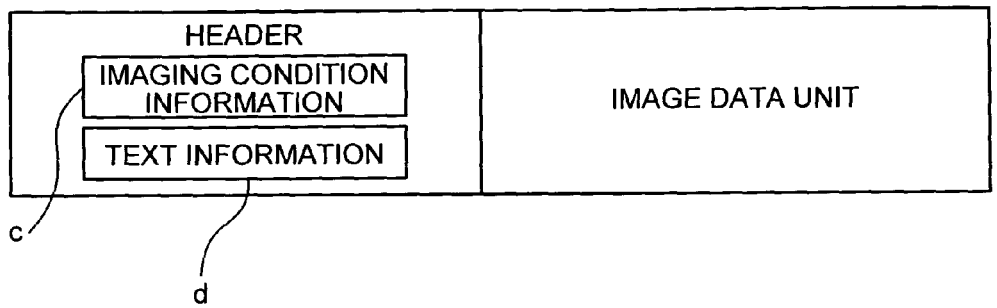
FIG. 11 is an explanatory diagram of an Exif file format according to a second embodiment.

FIG. 11 is an explanatory diagram of an Exif file format. As shown in FIG. 11, in the digital still camera B according to the second embodiment, in addition to the imaging condition information c, text information d that is memos such as title names of taken images can be recorded as additional information in an Exif header unit of the Exif file. The text information d is prepared by the CPU of the main controller 14 following the control program so that predetermined character strings are displayed on the display unit 17 and a user makes selections among such strings by operating the operation unit 28, or a software keyboard is displayed on the display unit 17 and a user inputs characters through the software keyboard by operating the operation unit 28.

Figure 12:
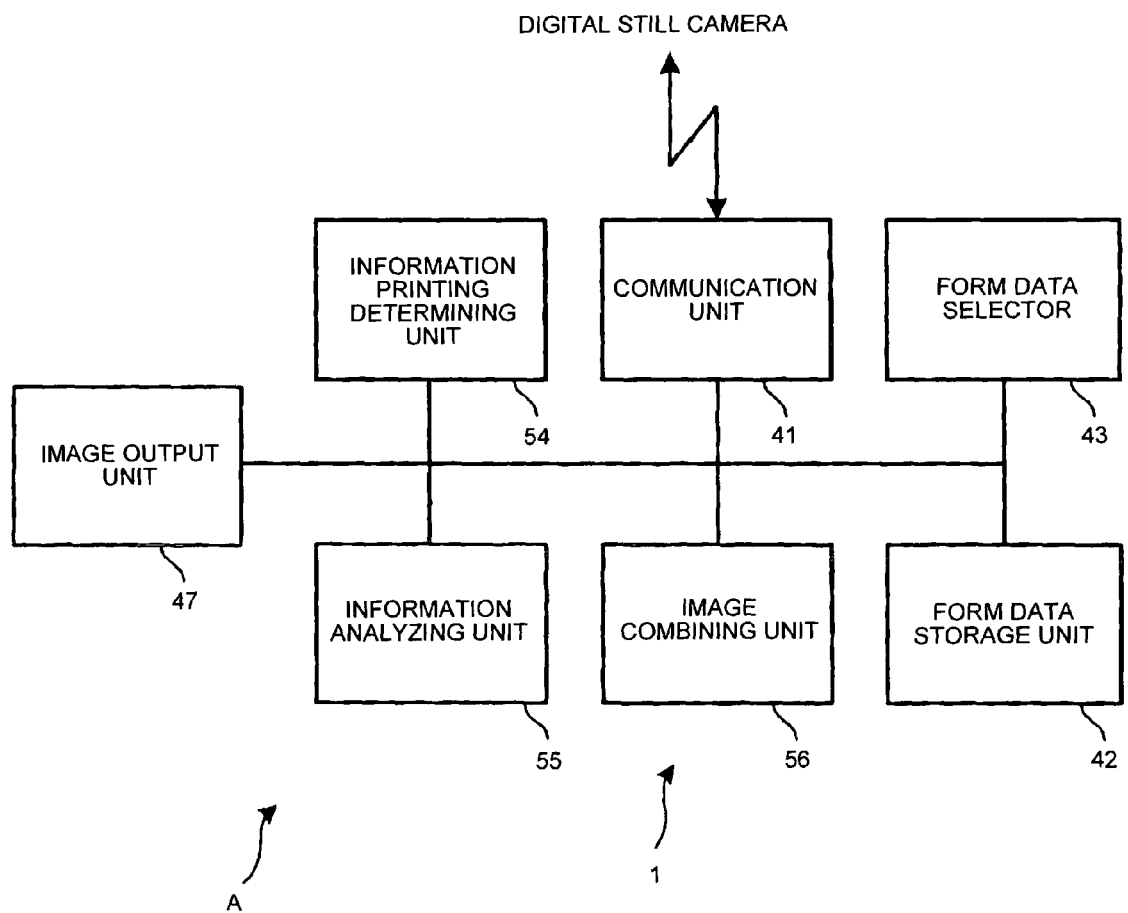
FIG. 12 is a functional block diagram of characteristic functions fulfilled by operations of the system controller provided in the color laser printer according to the control processing program.

FIG. 12 is a functional block diagram of characteristic functions fulfilled by operations of the system controller 1 provided in the color laser printer A according to the control processing program. As shown in FIG. 12, by operations of the control processing program, the system controller 1 fulfils functions of a communication unit 41, a form data storage unit 42, a form data selector 43, an information printing determining unit 54, an information analyzing unit 55, an image combining unit 56, and an image output unit 47.

The information printing determining unit 54 determines whether the information (the text information d) embedded into the image file that is received by the communication unit 41 from the digital still camera B is printed.

The information analyzing unit 55 obtains the information (the text information d) embedded into the image file that is received from the digital still camera B when it is instructed by the information printing determining unit 54 to print the information (the text information d) embedded into the image file.

The image combining unit 56 combines the image file received by the communication unit 41 from the digital still camera B with the form data that is selected by the form data selector 43 from various form data held by the form data storage unit 42 in the magnetic disk device 10. When it is instructed by the information printing determining unit 54 to print the information (the text information d) embedded into the image file, the information analyzing unit 55 obtains the information (the text information d) included in the image file. Characters that represent the information (the text information d), images, and the form are then combined so as to be output.

Specific examples of the characteristic functions fulfilled by operations of the system controller 1 according to the control processing program are described next.

For example, on the side of the digital still camera B, when a user specifies to print memos such as title names of taken images by using the display unit 17 of the digital still camera B, in the color laser printer A, the images specified by the user to be output are rendered, the form data is rendered, and the text information d that is stored in the header of the Exif image file is referred in order to be printed as characters.

Figure 13:
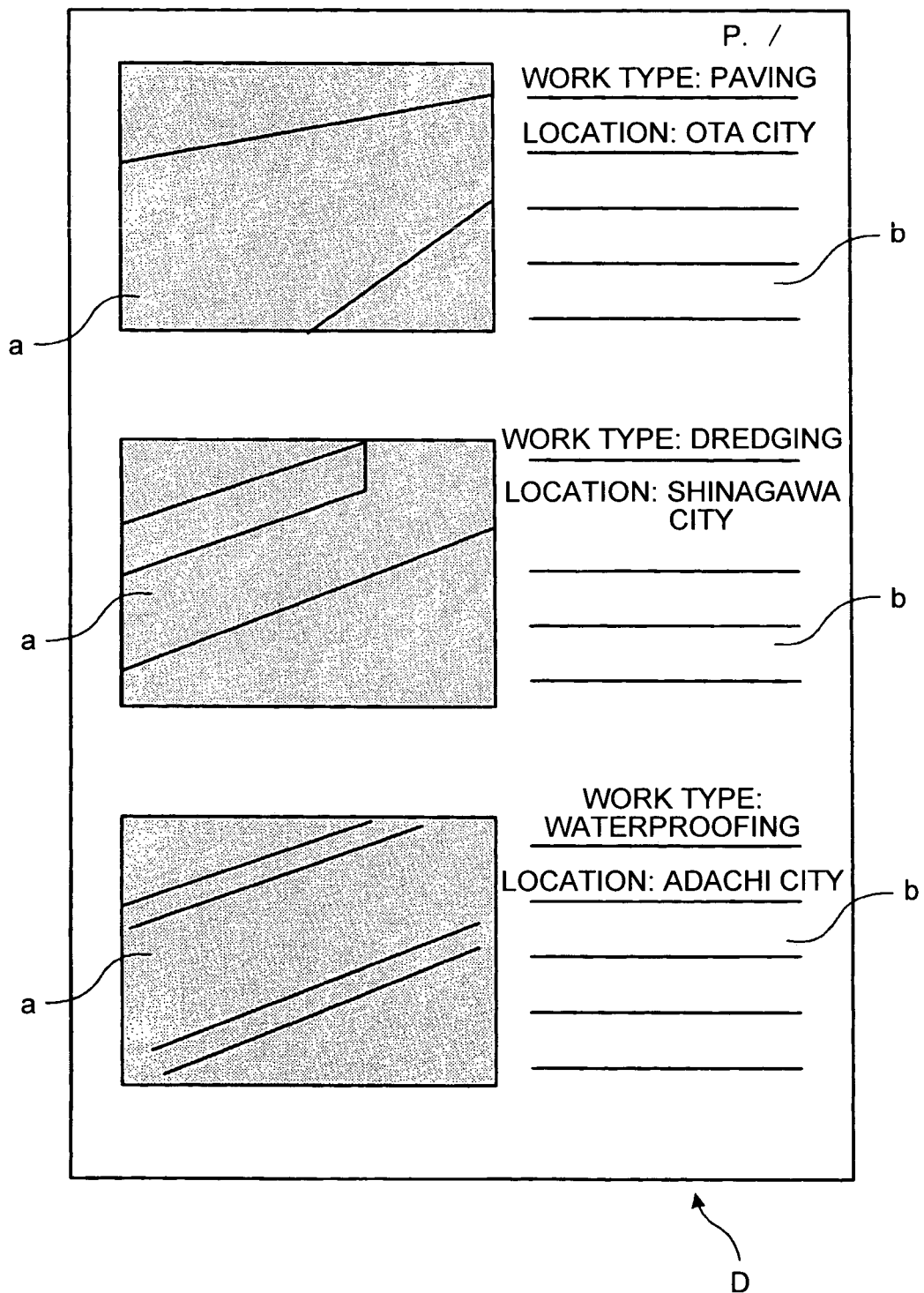
FIG. 13 is a plan view of an example of a printed form.

FIG. 13 is an example of a printed form when the form data for preparing the form D shown in FIG. 3 is selected by the form data selector 43. With reference to FIG. 13, the image file received from the digital still camera B is printed on the area a of the form D, and the text information d included in the image file is printed on the area b of the form D.

As described above, according to this embodiment, an image is generated that the image data in the image file and the information embedded into the image file are arranged according to the configuration of the form data stored in advance in the magnetic disk device 10, and the generated image is output to the printer engine 7. Thus, at the time of direct print that the digital still camera B is directly connected to the color laser printer A, a user can print the information embedded into the image file as characters by an easier and simpler system. Accordingly, the color laser printer A with a highly convenient output function, the image printing system, the program and the image combining and outputting method can be provided.

As the information that is embedded into the image file is the text information d, for example, camera memos can be printed and output together with the image data.

While the color laser printer A is utilized as the image forming apparatus in the embodiments, the present invention is not limited to the color laser printer. Ink jet printers can be also utilized as the image forming apparatus. When ink jet printers are utilized as the image forming apparatus, the printer engine 7 of the image forming apparatus prints and outputs data on a recording medium by using known ink jet printing techniques.

While the digital still camera B is explained as an image supplying apparatus, the present invention is not limited to the digital still camera. Storages that can hold a large quantity of data can be utilized.

According to the above embodiments, an image is generated that the image data in the image file and the information embedded into the image file are arranged according to the configuration of the form data stored in advance in the storage unit, and the generated image is output to the image forming unit. Thus, at a time of direct print that the image supplying apparatus is directly connected to the image forming apparatus, a user can print the information embedded into the image file since characters by an easier and simpler system. Accordingly, the image forming apparatus with a highly convenient output function is provided.

Moreover, since form data is selected from various form data stored in the storage unit, desired form data can be selected. Thus, convenience is improved.

Furthermore, since the information embedded into the image file is the imaging condition information about imaging conditions of the image data in the image file, for example, a shutter speed can be printed and output together with the image data.

Moreover, since the imaging condition information that is stored in the header of the image file in the widely-used Exif file format is obtained to be printed, convenience is improved.

Furthermore, since the information embedded into the image file is the text information, for example, camera memos can be printed and output together with the image data.

Moreover, the text information that is stored in the header of the image file in the widely-used Exif file format is obtained to be printed. Thus, dedicated PC applications are not required and convenience is improved.

Furthermore, an image is generated that the image data in the image file and the information embedded into the image file are arranged according to the configuration of the form data stored in advance in the storage unit, and the generated image is output to the image forming unit. Thus, at a time of direct print that the image supplying apparatus is directly connected to the image forming apparatus, a user can print the information embedded into the image file as characters by an easier and simpler system. Accordingly, the image printing system with a highly convenient output function is provided.

Moreover, since form data is selected from various form data stored in the storage unit, desired form data can be selected. Thus, convenience is improved.

Furthermore, since the information embedded into the image file is the imaging condition information about imaging conditions of the image data in the image file, for example, a shutter speed can be printed and output together with the image data.

Moreover, since the imaging condition information that is stored in the header of the image file in the widely-used Exif file format is obtained to be printed, convenience is improved.

Furthermore, since the information embedded into the image file is the text information, for example, camera memos can be printed and output together with the image data.

Moreover, the text information that is stored in the header of the image file in the widely-used Exif file format is obtained to be printed. Thus, dedicated PC applications are not required and convenience is improved.

Furthermore, the image supplying apparatus is a digital still camera. Thus, the direct print system with high throughput is provided.

Moreover, an image is generated that the image data in the image file and the information embedded into the image file are arranged according to the configuration of the form data stored in advance in the storage unit, and the generated image is output to the image forming unit. Thus, at a time of direct print that the image supplying apparatus is directly connected to the image forming apparatus, a user can print the information embedded into the image file as characters by an easier and simpler system. Accordingly, the program with a highly convenient output function is provided.

Moreover, since form data is selected from various form data stored in the storage unit, desired form data can be selected. Thus, convenience is improved.

Furthermore, an image is generated that the image data in the image file and the information embedded into the image file are arranged according to the configuration of the form data stored in advance in the storage unit, and the generated image is output to the image forming unit. Thus, at a time of direct print that the image supplying apparatus is directly connected to the image forming apparatus, a user can print the information embedded into the image file as characters by an easier and simpler system. Accordingly, the image combining and outputting system with a highly convenient output function is provided.

Moreover, since form data is selected from various form data stored in the storage unit, desired form data can be selected. Thus, convenience is improved.

Furthermore, since the information embedded into the image file is the imaging condition information about imaging conditions of the image data in the image file, for example, a shutter speed can be printed and output together with the image data.

Moreover, since the imaging condition information that is stored in the header of the image file in the widely-used Exif file format is obtained to be printed, convenience is improved.

Furthermore, since the information embedded into the image file is the text information, for example, camera memos can be printed and output together with the image data.

Moreover, the text information that is stored in the header of the image file in the widely-used Exif file format is obtained to be printed. Thus, dedicated PC applications are not required and convenience is improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image printing system, comprising:
    an image capturing apparatus; and
    an image printing apparatus connected to the image capturing apparatus, wherein
    the image capturing apparatus includes:
        a capturing unit configured to capture an image and to generate image data;
        a processing unit configured to generate an imaging condition information at a time when the capturing unit captures the image; and
        a transferring unit configured to transfer, to the image printing apparatus, the image data and the imaging condition information when the capturing unit captured the image, and
    the image printing apparatus includes:
        a receiving unit configured to receive the image data and the imaging condition information when the capturing unit captured the image;
        an image arranging unit configured to arrange a plurality of sets of the image data and the imaging condition information when the capturing unit captured the image; and
        an image printing unit configured to print the sets of the image data and the imaging condition information when the capturing unit captured the image based on a printing request from the image capturing apparatus.

2. The image printing system according to claim 1, wherein the imaging condition information includes at least one of an exposure program mode, a photometry mode, an aperture value, an open aperture value, a shutter speed, a focal distance, a focused distance, an exposure correction value, an ISO sensitivity value, and determination of light sources.

3. The image printing system according to claim 1, wherein the image printing apparatus further comprises:
    a storage unit configured to store therein form data, the form data including a plurality of set of information-embedding areas and an image-data area in one page, wherein the received imaging condition information is to be arranged in the information-embedding area, the received image data is to be arranged in the image-data area, and the information-embedding area and the image-data area in each set of the information-embedding area and the image-data area are arranged next to each other.

4. The image printing system according to claim 3, wherein the storage unit stores a plurality of form data and the image printing apparatus further comprises a form data selecting unit that selects a form data among the plurality of form data stored in the storage unit.

5. The image printing apparatus according to claim 1, wherein the plurality of image data include an Exchangeable Image File Format (Exif) file format, and the imaging condition information is stored in a header of the plurality image data.

6. The image printing apparatus according to claim 3, wherein the transferring unit transfers an image data file including the image data and the imaging condition information,
the receiving unit receives the image data file, and
the image printing apparatus further comprises an extracting unit configured to extract image data and imaging condition information corresponding to the image data from each of the received plurality of image data file.

7. The image printing apparatus according to claim 1, wherein the image printing apparatus is directly connected to the image capturing apparatus.

8. The image printing system according to claim 1, wherein the image capturing apparatus is a digital still camera.

9. An image printing apparatus connected to an image capturing apparatus that includes: a capturing unit configured to capture an image and to generate image data; a processing unit configured to generate an imaging condition information at a time when the capturing unit captures the image; and a transferring unit configured to transfer, to the image printing apparatus, the image data and the imaging condition information when the capturing unit captured the image, the image printing apparatus comprising:
a receiving unit configured to receive the image data and the imaging condition information when the capturing unit captured the image;
an image arranging unit configured to arrange a plurality of sets of the image data and the imaging condition information when the capturing unit captured the image; and
an image printing unit configured to print the sets of the image data and the imaging condition information when the capturing unit captured the image based on a printing request from the image capturing apparatus.

10. The image printing apparatus according to claim 9, wherein the imaging condition information includes at least one of an exposure program mode, a photometry mode, an aperture value, an open aperture value, a shutter speed, a focal distance, a focused distance, an exposure correction value, an ISO sensitivity value, and determination of light sources.

11. The image printing apparatus according to claim 9, wherein the image printing apparatus further comprises:
a storage unit configured to store therein form data, the form data including a plurality of set of information-embedding areas and an image-data area in one page, wherein the received imaging condition information is to be arranged in the information-embedding area, the received image data is to be arranged in the image-data area, and the information-embedding area and the image-data area in each set of the information-embedding area and the image-data area are arranged next to each other.

12. The image printing apparatus according to claim 11, wherein the storage unit stores a plurality of form data and the image printing apparatus further comprises a form data selecting unit that selects a form data among the plurality of form data stored in the storage unit.

13. The image printing apparatus according to claim 9, wherein the plurality of image data include an Exchangeable Image File Format (Exif) file format, and the imaging condition information is stored in a header of the plurality image data.

14. The image printing apparatus according to claim 11, wherein the transferring unit transfers an image data file including the image data and the imaging condition information,
the receiving unit receives the image data file, and
the image printing apparatus further comprises an extracting unit configured to extract image data and imaging condition information corresponding to the image data from each of the received plurality of image data file.

15. The image printing apparatus according to claim 9, wherein the image printing apparatus is directly connected to the image capturing apparatus.

16. The image printing apparatus according to claim 9, wherein the image capturing apparatus is a digital still camera.

17. A non-transitory computer-readable recording medium that stores therein a computer program that causes a computer to execute a printing function in an image forming apparatus, comprising:
capturing, by a capturing unit in an image capturing apparatus, an image and generating image data;
generating, by a processing unit in the image capturing apparatus, an imaging condition information at a time when the capturing unit captures the image;
transferring, by a transferring unit in the image capturing apparatus, the image data and the imaging condition information when the capturing unit captured the image, to an image printing apparatus;
receiving, by a receiving unit in the image printing apparatus, the image data and the imaging condition information when the capturing unit captured the image;
arranging, by an image arranging unit in the image printing apparatus, a plurality of sets of the image data and the imaging condition information when the capturing unit captured the image; and
printing, by an image printing unit in the image printing apparatus, the sets of the image data and the imaging condition information when the capturing unit captured the image based on a printing request from the image capturing apparatus.

18. The non-transitory computer-readable recording medium according to claim 17, wherein the imaging condition information includes at least one of an exposure program mode, a photometry mode, an aperture value, an open aperture value, a shutter speed, a focal distance, a focused distance, an exposure correction value, an ISO sensitivity value, and determination of light sources.

19. The non-transitory computer-readable recording medium according to claim 17, wherein the image printing apparatus further comprises:
a storage unit configured to store therein form data, the form data including a plurality of set of information-embedding areas and an image-data area in one page, wherein the received imaging condition information is to be arranged in the information-embedding area, the received image data is to be arranged in the image-data area, and the information-embedding area and the image-data area in each set of the information-embedding area and the image-data area are arranged next to each other.

20. The non-transitory computer-readable recording medium according to claim 19, wherein the storage unit stores a plurality of form data and the image printing apparatus further comprises a form data selecting unit that selects a form data among the plurality of form data stored in the storage unit.

21. The non-transitory computer-readable recording medium according to claim 17, wherein the plurality of image data include an Exchangeable Image File Format (Exif) file format, and the imaging condition information is stored in a header of the plurality image data.

22. The non-transitory computer-readable recording medium according to claim 19, wherein the transferring unit transfers an image data file including the image data and the imaging condition information,
the receiving unit receives the image data file, and
the image printing apparatus further comprises an extracting unit configured to extract image data and imaging condition information corresponding to the image data from each of the received plurality of image data file.

23. The non-transitory computer-readable recording medium according to claim 17, wherein the image printing apparatus is directly connected to the image capturing apparatus.

24. The non-transitory computer-readable recording medium according to claim 17, wherein the image capturing apparatus is a digital still camera.

25. A method for combining and outputting an image through an image printing system including an image capturing apparatus having a capturing unit, a processing unit, and a transferring unit, and an image printing apparatus having a receiving unit, an image arranging unit, and an image printing unit, the method comprising:
capturing, using the capturing unit in the image capturing apparatus, an image and generating image data;
generating, using the processing unit in the image capturing apparatus, an imaging condition information at a time when the capturing unit captures the image;
transferring, using the transferring unit in the image capturing apparatus, the image data and the imaging condition information when the capturing unit captured the image, to an image printing apparatus;
receiving, using the receiving unit in the image printing apparatus, the image data and the imaging condition information when the capturing unit captured the image;
arranging, using the image arranging unit in the image printing apparatus, a plurality of sets of the image data and the imaging condition information when the capturing unit captured the image; and
printing, using the image printing unit in the image printing apparatus, the sets of the image data and the imaging condition information when the capturing unit captured the image based on a printing request from the image capturing apparatus.

26. The method according to claim 25, wherein the imaging condition information includes at least one of an exposure program mode, a photometry mode, an aperture value, an open aperture value, a shutter speed, a focal distance, a focused distance, an exposure correction value, an ISO sensitivity value, and determination of light sources.

27. The method according to claim 25, wherein the image printing apparatus further comprises:
a storage unit configured to store therein form data, the form data including a plurality of set of information-embedding areas and an image-data area in one page, wherein the received imaging condition information is to be arranged in the information-embedding area, the received image data is to be arranged in the image-data area, and the information-embedding area and the image-data area in each set of the information-embedding area and the image-data area are arranged next to each other.

28. The method according to claim 27, wherein the storage unit stores a plurality of form data and the image printing apparatus further comprises a form data selecting unit that selects a form data among the plurality of form data stored in the storage unit.

29. The method according to claim 25, wherein the plurality of image data include an Exchangeable Image File Format (Exif) file format, and the imaging condition information is stored in a header of the plurality image data.

30. The method according to claim 27, wherein the transferring unit transfers an image data file including the image data and the imaging condition information, and the receiving unit receives the image data file, and
wherein the image printing apparatus further comprises an extracting unit configured to extract image data and imaging condition information corresponding to the image data from each of the received plurality of image data file.

31. The method according to claim 25, wherein the image printing apparatus is directly connected to the image capturing apparatus.

* * * * *